H. M. SMITH.
PREHEATING DEVICE FOR LIQUID FUEL BURNERS.
APPLICATION FILED NOV. 12, 1919.
1,362,829.
Patented Dec. 21, 1920.
2 SHEETS—SHEET 1.
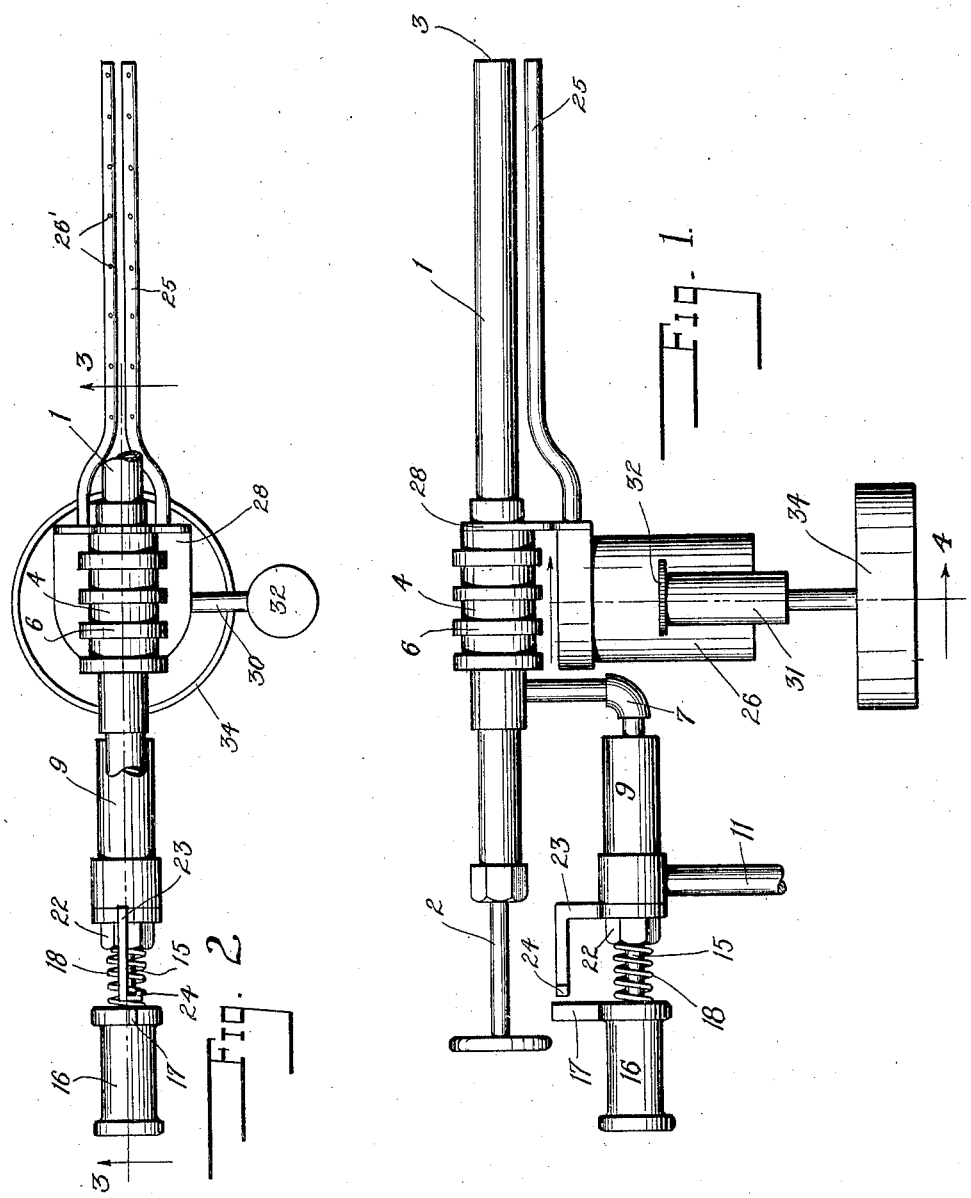
INVENTOR.
Harry M Smith
BY
ATTORNEYS.

H. M. SMITH.
PREHEATING DEVICE FOR LIQUID FUEL BURNERS.
APPLICATION FILED NOV. 12, 1919.
1,362,829.
Patented Dec. 21, 1920.
2 SHEETS—SHEET 2.
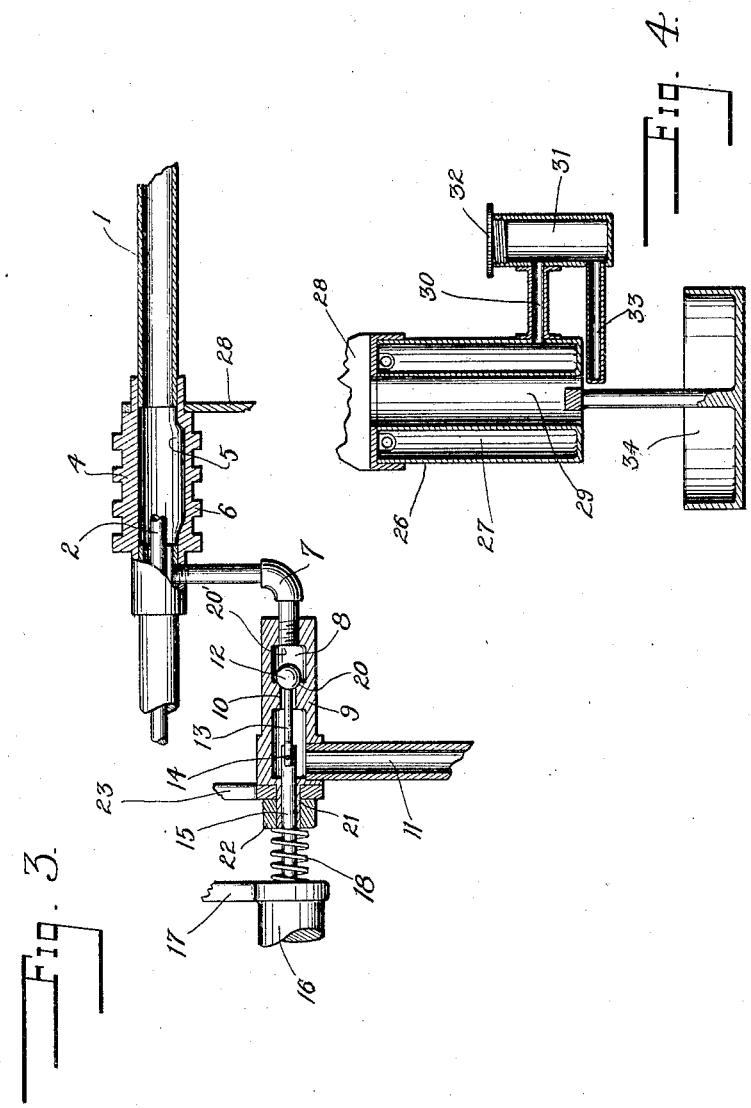
INVENTOR.
Harry M. Smith
BY
ATTORNEYS.

UNITED STATES PATENT OFFICE.

HARRY M. SMITH, OF DALY CITY, CALIFORNIA, ASSIGNOR TO COLMAR BURNER COMPANY, A CORPORATION OF CALIFORNIA.

PREHEATING DEVICE FOR LIQUID-FUEL BURNERS.

1,362,829.

Specification of Letters Patent.

Patented Dec. 21, 1920.

Application filed November 12, 1919. Serial No. 337,592.

*To all whom it may concern:*

Be it known that I, HARRY M. SMITH, a citizen of the United States, residing at Daly City, in the county of San Mateo and State of California, have invented certain new and useful Improvements in Preheating Devices for Liquid-Fuel Burners, of which the following is a specification.

In hydrocarbon burners as at present mounted in stoves, furnaces and the like, the fuel burners extend into the fire-box and it is customary to mount the burner and its generator permanently within the fire-box.

In the lighting of the burners, it is the present practice to provide wick channels beneath the generator which are filled with a light gravity fuel by means of an oil can or like device, and which is subsequently ignited. In this filling operation the fuel often overflows the channels and spreads to other parts of the fire-box, causing great excitement and damage to inexperienced operators, and in certain installations an extremely long spouted filling receptacle is required in order to fill the channels for their entire length, which is necessary in obtaining a uniform heating of the generator for the proper vaporizing of the fuel therein.

The present invention relates to a preheating device for liquid fuel generators, which is capable of being operated from the exterior of the fire-box and which is adapted for heating the fuel generator for its full length, and also for heating or gasifying a priming fuel charge contained within the generator. A further object is to provide a construction wherein a priming fuel charge may be admitted to the fuel generator gasifying chamber for heating by the preheating device. A further object is to provide a construction of the preheating type above described, wherein the preheating fuel is expanded, due to heat, and is gasified prior to ignition for heating the generator, and due to said expansion is forced in coöperative relation to the fuel generator simultaneously with the heating of the priming charge in the burner gasifying chamber.

With the above mentioned and other objects in view, the invention consists in the novel construction and combination of parts hereinafter described, illustrated in the accompanying drawings and pointed out in the claims hereto appended; it being understood that various changes in the form, proportion, size, and minor details of construction within the scope of the claims may be resorted to without departing from the spirit or sacrificing any of the advantages of the invention.

To more fully comprehend the invention, reference is directed to the accompanying drawings, wherein :—

Figure 1 is a view in side elevation of the preferred embodiment of my invention.

Fig. 2 is a view in top plan.

Fig. 3 is a sectional view taken on line 3—3 of Fig. 2.

Fig. 4 is a sectional view taken on line 4—4 of Fig. 1.

Referring more particularly to the drawings, wherein like characters of reference designate corresponding parts—1 indicates a fuel generator, of any well known type, but preferably tubular in form, as in Fig. 3, and having extended longitudinally thereof the generator control valve 2 which controls the escape of the generated gases from the discharge end 3 of the generator 1. Within its length, and preferably at a point exteriorly of the generator from that point thereof which extends into the fire-box, is positioned a priming charge heating or gasifying casting 4, the interior of which is formed with a depression or chamber 5 and its exterior is provided with the heat absorbing ribs or fins 6.

The fuel for admission into the generator and to be generated into a gas therein, is fed into the generator 1 through a pipe 7 communicating with the generator at the rear end of the casting 4, and said pipe 7 leads from one end of a valve chamber 8 in a casting 9, and with the other end of said chamber 8 communicates a passage 10 of small diameter which in turn communicates with a fuel feed pipe 11.

In the chamber 8 is positioned a ball valve 12 carried by a stem 13 passing through the channel 10, and which is pivotally connected, as at 14, with an operating stem 15, passing exteriorly through the casting 9. The outer end of the stem 15 is provided with a handle 16 upwardly from the forward end of which extends a finger 17, and between the inner face of said handle 16 and the outer end of the casting 9 is interposed a coiled spring 18 for normally maintaining the ball valve 12 resting on the seat 20, at one end of the chamber 8.

Upwardly extending from one end of the casting 9 and surrounding the threaded nipple 21 thereof, on which is received a nut 22, is a bent arm 23 having a laterally disposed or hooked end 24, Figs. 1 and 2 of the drawings, which is adapted to receive the finger 17 on the inward depression of the handle 16 and maintain the ball valve 12 between the opposite ends of the chamber 8, (this position being hereinafter termed the running or operating position for the valve).

When priming the generator, the handle 16 is quickly pushed inwardly and then released, which causes the valve 12 to travel the length of the chamber 8, and in its extreme forward movement to engage the seat 20' and in its rear movement to remain in engagement with the seat 20, and the period of travel of the valve between the two seats admitting a fuel charge under pressure from the pipe 11 into the depression 5 in the casting 6.

During the priming operation, the handle 16 is axially rotated to remove the finger 17 from coöperative engagement with the hooked end 24, and when operated for running position, it is rotated to position the finger for engagement by the hooked end 24.

Extending longitudinally beneath opposite sides of the generator 1 are the generator preheating pipes 25, preferably perforated throughout their length, as at 26, and said pipes are supported at their inner end by the wall 26' of a generator preheating fuel gasifying chamber 27, which is supported beneath the casting 4 by a suitable bracket or plate 28, and said chamber is provided with the vertical open ended channel 29.

Extending laterally from the base of the chamber 27 is a pipe 30 communicating with a fuel sump 31 adapted to be closed by a cover 32, and from the base of said sump 31 extends a closed channel 33 which terminates adjacent the lower end of the channel 29, Fig. 4 of the drawings.

A suitable lamp 34 is positioned beneath the chamber 27, Fig. 4 of the drawings, and the same is adapted to be filled or charged with a volume of suitable fuel, preferably wood alcohol, which is also poured into the sump 31, filling said sump to its capacity.

The device being assembled, as in the drawings, the same operates in the following manner:—The pipe 11 being connected to a fuel supply, preferably coal-oil, under pressure, the generator valve 2 being slightly open and the sump 31 being filled with preferably wood alcohol, the igniting of the lamp 34 heats the arm 33 associated with the sump 31 and expands the fuel contained therein, forcing the fuel from the sump through the pipe 30 into the chamber 27.

A priming charge is admitted into the depression 5 in the casting 6 by the operation of the valve 12, as heretofore described, and the heat from the lamp 34 rising through the channel 29 heats said casting 4 and also heats the fuel admitted into the chamber 27 by the expansion of the fuel contained in the sump 31. The continued heating of the fuel in the chamber 27 generates a gas within said chamber, which flows into the pipe 27 and is ignited in any suitable manner as it escapes from the perforations 26 therein. Thus the flame from the generator preheating pipes heats the generator 1 its full length while the fuel charge within the depression 5 is also being highly heated, and on the same reaching a certain temperature it passes in the form of gas through the generator 1, and on the generation of sufficient gas from the priming charge within the depression 5, the valve 16 is placed to running position and the fuel admitted into the generator is generated into a gas by the heat of the fuel burners, not shown, which are positioned beneath the generator 1, as in the patent to Johnson No. 1300171 and in the Colmar pending application Serial Number 295050, filed May 6th, 1919, allowed April 8th, 1920, and entitled Hydro-carbon burner.

It will be apparent that the flame from the generator preheating pipes will ignite the gas escaping from the end of the generator 3 at such time as sufficient gas is formed within the generator by the heat of the pre-heating charge.

Having thus described my invention, what I claim as new and desire to protect by Letter Patent is:—

1. A preheating and igniting device for tubular generators for liquid fuel burners, the same comprising a fuel gasifying chamber beneath said generator at a point removed from its discharge end, a fuel chamber associated with said gasifying chamber and connecting therewith, means beneath said fuel gasifying and fuel chambers for heating that portion of the generator directly thereabove, and a perforated pipe connecting with said gasifying chamber and extending therefrom beneath said generator toward the discharge end thereof.

2. A preheating and igniting device for tubular generators for liquid fuel burners, the same comprising a fuel gasifying chamber beneath said generator at a point removed from its discharge end, means beneath said fuel gasifying chamber for heating the same, and for heating that portion of the generator directly thereabove, and a perforated pipe within said gasifying chamber and extending therefrom beneath said generator toward the discharge end thereof.

3. A preheating and igniting device for tubular generators for liquid fuel burners, the same comprising a charge receiving depression within the generator, means for admitting a fuel charge thereto, a fuel gasifying chamber beneath said generator, a perforated pipe connecting with said gasifying chamber and extending therefrom beneath said generator toward the discharge end thereof, and a means beneath said fuel gasifying chamber and said charge receiving depression within said generator for simultaneously heating the same.

4. A preheating and igniting device for tubular generators for liquid fuel burners, the same comprising a fuel gasifying chamber beneath said generator at a point removed from its discharge end, a fuel chamber associated with said gasifying chamber and provided with a fuel receiving member extending from the base thereof to a point beneath said gasifying chamber, a perforated pipe connecting with said gasifying chamber and extending therefrom beneath said generator toward the discharge end thereof, and a member beneath said generator for heating the same and for heating said fuel receiving member associated with said fuel receiving chamber.

5. A preheating and igniting device for tubular generators for liquid fuel burners, the same comprising a fuel gasifying chamber independent of said generator, and a perforated burner extended therefrom and disposed parallel with and in coöperative relation with said generator and directing its flame on said generator for heating the same by the gas generated in said gasifying chamber.

6. A preheating and igniting device for tubular generators for liquid fuel burners, the same comprising a fuel gasifying chamber independent of said generator, a perforated burner extended therefrom toward the discharge of said generator and disposed parallel and in coöperative relation with said generator so that the flame issuing from said burner perforations is directed against said tubular generator, and means for heating said chamber whereby the gas generated in said gasifying chamber flows from its burner through the perforations therein to heat said generator.

7. A preheating and igniting device for tubular generators for liquid fuel burners, the same comprising a member within said generator and provided with a fuel priming charge receiving depression, a fuel feed pipe connecting with said generator for supplying fuel thereto under pressure, a normally seated valve for controlling the flow of fuel thereto from said pipe into said generator, means beneath said priming charge receiving depression for heating said member whereby said priming charge is gasified, and a generator igniting and heating pipe extended from said means and beneath said generator.

8. A preheating and igniting device for tubular generators for liquid fuel burners, the same comprising a member within said generator and provided with a priming charge receiving depression, a fuel feed pipe connecting with said generator for supplying fuel thereto under pressure, a ball valve for controlling the flow of fuel from said pipe to said generator, a plurality of seats with which said valve coöperates, a spring for maintaining said valve normally in engagement with one of said seats, a stem associated with said valve, a finger associated with the stem, a stationary arm adapted for engaging said stem for holding said valve in open position between said seats, and means beneath said depression for heating the fuel charge received therein.

9. A preheating and igniting device for tubular generators for liquid fuel burners, the same comprising a fuel gasifying chamber associated with said generator at a point removed from its discharge end, a fuel supply connecting with said gasifying chamber, means beneath said fuel gasifying chamber for heating that portion of the generator directly thereabove, and a perforated pipe connecting with said gasifying chamber and extending therefrom beneath said generator toward the discharge end thereof and arranged with its perforations directed toward the tubular generator whereby a flame issuing therefrom will heat said tubular generator.

10. In combination with a tubular generator for liquid fuel provided with a gas discharge outlet at its outer end, a preheating device for said generator, the same comprising a pipe disposed longitudinally thereof and provided in its side wall with a plurality of perforations directed toward said tubular generator, a liquid fuel gasifying chamber associated with said pipe and adapted for containing a quantity of liquid fuel, and a heating element associated with said gasifying chamber and adapted to raise the temperature thereof sufficiently to convert the liquid fuel therein into gas and to cause the same to discharge from the perforations in said pipe on to said generator.

In testimony whereof I have signed my name to this specification in the presence of two subscribing witnesses.

HARRY M. SMITH.

Witnesses:
HARRY A. TOTTEN,
D. B. RICHARDS.